United States Patent
Birk et al.

(10) Patent No.: US 8,915,552 B2
(45) Date of Patent: Dec. 23, 2014

(54) BRUSH HEAD AND METHOD AND TOOL FOR PRODUCING SAME

(71) Applicant: Braun GmbH, Kronberg (DE)

(72) Inventors: Andreas Birk, Kronberg (DE); Lars Foerster, Kronberg (DE); Ulrich Pfeifer, Muzenberg (DE); Klaus Amsel, Schmitten (DE); Guenther Alschweig, Eschborn (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 14/264,765

(22) Filed: Apr. 29, 2014

(65) Prior Publication Data
US 2014/0232173 A1    Aug. 21, 2014

Related U.S. Application Data (63) Continuation of application No. 13/517,693, filed on Jun. 14, 2012.

(30) Foreign Application Priority Data

Jun. 15, 2011 (EP) ..................... 11004870

(51) Int. Cl.
A46B 3/06 (2006.01)
A46D 3/04 (2006.01)
A46D 9/06 (2006.01)

(52) U.S. Cl.
CPC ........................ *A46D 9/06* (2013.01)
USPC ............................................ 300/21

(58) Field of Classification Search
CPC ................. A46D 3/005; A46D 3/06
USPC ............... 15/167.1, 191.1, 192, 193, DIG. 6; 300/21
See application file for complete search history.

(56) References Cited

FOREIGN PATENT DOCUMENTS

DE     19853030 A1 * 5/2000 ............ A46D 3/04

* cited by examiner

*Primary Examiner* — Mark Spisich
*Assistant Examiner* — Andrew A Horton
(74) *Attorney, Agent, or Firm* — Vladimir Vitenberg (57) ABSTRACT

A brush head, particularly a toothbrush head, may have a plurality of cleaning elements, in particular bristle tufts, which are anchored by an end section in a brush carrier, wherein the cleaning elements may be cast with positive engagement in blind-hole shaped retaining recesses. For producing such a brush head different cleaning elements, such as bristle tufts may be fused by heat and may be placed in a mold cavity to be over-molded.

8 Claims, 10 Drawing Sheets

BRUSH HEAD AND METHOD AND TOOL FOR PRODUCING SAME

FIELD OF THE INVENTION

A brush head, in particular a toothbrush head is described, having a plurality of cleaning elements, in particular bristle tufts, which are anchored by one of their ends in a bristle carrier, and wherein the cleaning elements are molded in blind-hole shaped retaining recesses in a form-closed manner. Further a method and a tool for producing a brush head, in particular a toothbrush head, are disclosed in which cleaning elements, in particular bristle tufts, are fused at one of their ends using heat before these ends are embedded into the bristles carrier, for instance by over-molding with a plastic material.

BACKGROUND OF THE INVENTION

Various methods are known in order to fasten the bristle tufts in the bristle carrier of toothbrushes, wherein usually injection-molding from plastic is used. There are known the so-called anchor tufting methods, in which the bristles of a tuft are bent, in the shape of a U, around a retaining web which is then driven into a blind hole. There are also known the so-called hot-tufting methods, in which the bristle tufts are anchored on the bristle carrier by means of a forming technique. Usually, the bristle tufts are melted at their ends to form thickenings and then are over-molded with plastic or cast into the head when the brush head is injection-molded.

Such hot-tufting methods have various advantages, for example with respect to hygiene, because less bacteria can collect in the anchoring areas, or also with respect to the cross-sectional geometry of the bristle tufts, which can be designed in greater variety than with the anchor tufting methods. But, it is not easy to generate bristle fields with different properties in different areas using the hot-tufting method. In order to optimize the cleaning efficiency of toothbrushes, it may be helpful to provide different cleaning elements or bristle tufts in different sections of the bristle field. It can be also helpful support cleaning elements or bristle tufts in a different manner, for example to support a portion thereof rigidly in a section of hard plastic and another portion thereof flexibly in a section of soft plastic. In addition, it may also be beneficial to melt the ends of differently composed bristle tufts, for example consisting of different bristle material, to different degrees, in order to achieve an optimum anchoring. However, this is difficult using hot-tufting methods which melt the ends of the tufts after the tufts have been configured into a bristle field, because the usually required application of heat to a bristle tuft always also affects adjacent tuft ends.

A hot-tufting method is known, in which the bristle tufts that are held ready in the form of a bristle field are melted at their ends to such an extent that the melted material of adjacent bristle tufts combines. The resulting flat support structure, which connects the bristle tufts, is intended to achieve an increased pull-out resistance. However, it is difficult in this case to use bristle tufts of differing bristle materials in order to achieve different properties in different bristle field sections, since different types of bristle materials cannot easily be fused together. This becomes even more difficult when not only bristle tufts but also differently designed cleaning elements, such as strips of soft plastic, are to be used and to be combined, for example, with bristle tufts. In addition, the flat support structure on the bottom of the bristle tufts inhibits quick filling of the mold cavities when the bristle carrier is injection-molded.

Accordingly, there is a need for a toothbrush head and manufacturing method thereof, which allows for design flexibility, material flexibility, and support flexibility.

SUMMARY OF THE INVENTION

According to one aspect a method for producing a brush head, for example a toothbrush head, is described in which at least two different cleaning elements selected from the group consisting of different types of cleaning elements, distinctive cleaning elements of the same type and a combination thereof are embedded at one of their ends at least partially in a bristle carrier, wherein said ends are fused by heat before embedding, wherein different amounts of heat are supplied to each of the at least two different cleaning elements.

According to another aspect a brush head, for example a toothbrush head, is described, having at least two different cleaning elements selected from the group consisting of different types of cleaning elements, distinctive cleaning elements of the same type and a combination thereof being embedded into the brush head, wherein the at least two cleaning elements are fused before embedding using the method described herein.

According to another aspect a device for producing a brush head, for example a toothbrush head is described in which at least two different cleaning elements selected from the group consisting of different types of cleaning elements, distinctive cleaning elements of the same type and a combination thereof are embedded at one of their ends at least partially in a bristle carrier, comprising a hot-gas device for applying hot gas to one end of the at least two different cleaning elements, wherein the hot-gas device comprises a multiplicity of nozzles for applying varying flows of hot gas.

According to another aspect a device for producing a brush head, for example a toothbrush head is described in which at least two different cleaning elements selected from the group consisting of different types of cleaning elements, distinctive cleaning elements of the same type and a combination thereof are embedded at one of their ends at least partially in a bristle carrier, comprising an infrared radiation device for applying infrared radiation to one end of the at least two different cleaning elements, wherein the infrared radiation device comprises a plurality of reflectors for applying varying degrees of infrared radiation.

These and other features, aspects and advantages of specific embodiments will become evident to those skilled in the art from a reading of the present disclosure.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, where like structure is indicated with like reference numerals and in which:

DETAILED DESCRIPTION OF THE INVENTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The brush head and the method for the production thereof as disclosed herein, as well as an improved tool for the production of said brush head allow design flexibility, for example, in the positioning of cleaning elements and allows providing of different types of cleaning elements, including cleaning elements made from differing materials. An improved brush head may comprise, for example, a compact form and is efficient to produce, despite the complex design of the bristle field thereof, having, for example, differently designed cleaning elements.

A method for producing a brush head, in particular a toothbrush head is shown, wherein different cleaning elements, in particular bristle tufts, are fused and over-molded at one of their ends using a plastic material. "Different cleaning elements" as used herein shall be understood as two different types of cleaning elements or two distinctive cleaning elements of the same type or a combination thereof. "Different types of cleaning elements" as used herein shall be understood as cleaning elements differing at least in the material they are made from. An example for different types of cleaning elements may be bristles made of different materials or bristles and elastomeric elements. "Distinctive cleaning elements of the same type" as used herein shall be understood as cleaning elements which are made of the same material, but which are distinguishable from each other in at least one other property. Examples for these other properties in which the distinctive cleaning elements of the same type may differ are e.g. size, composition, form, outer shape, surface appearance or a combination thereof. An example for distinctive cleaning elements of the same type may be bristle tufts having different tuft diameters or having different tuft geometries, or bristles being tapered or crimpled compared to unmodified bristles.

The cleaning elements may be held by at least one carrier part which has hole-shaped retaining recesses, in which the cleaning elements may be held during the process of fusing and over-molding. The position of the cleaning elements in the carrier part corresponds to the desired relative arrangement thereof with respect to one another on the brush head. Additionally, said carrier part may form a wall of the mold cavities, in which the ends of the cleaning elements extending out from the carrier part can be over-molded in a multi-component process. Owing to the use of the carrier part as part of the injection mold, the positioning of the ends of the cleaning elements to be over-molded as well as the opening and closing of the injection mold can be executed very simply and efficiently. The side of the carrier part facing the ends to be over-molded may form a negative mold for the cleaning-element-side or bristle-side surface of the bristle carrier of the brush head.

The cleaning elements can be transported from a first injection-molding station in which at least one part of a bristle carrier and/or a brush head is injection-molded to a second injection-molding station, in which at least another part of a bristle carrier and/or a brush head is injection-molded. Further steps of transportation to additional injection-molding stations in which additional parts of the bristle-carrier and/or the brush head can be injection-molded are also applicable to the method as described herein. Additionally, the cleaning elements may be located in the at least one carrier part during transportation. Thus, the aforementioned carrier part, in which the cleaning elements are arranged, may also used for handling and/or transporting of the cleaning elements in or between the different process steps. For example, the cleaning elements, arranged in the carrier part, may be positioned in various injection molds to mold different sections of the brush head. In addition, the cleaning elements may be arranged in the carrier part for the upstream process step, such as, for example, the thermal treatment for melting the ends of the cleaning elements to form thickenings. The carrier part may be also used as a part of the mold cavity for one or more of said injection-molding stations.

The thickenings at the cast ends of the cleaning elements are formed in order to increase the pull-out resistance of the cleaning elements from the bristle carrier. Said thickenings may be produced by thermal melting of the ends. The ends which are melted are the ends to be over-molded, i.e. said ends are not the ends for cleaning the teeth. A targeted energy flow is applied to the cleaning elements at their ends to be over-molded, either individually or in groups in each case, and reshaped into a thickening. Generally, this can be carried out by means of various types of energy flows in the form of mass flows and/or radiation. For example the ends to be thickened may have a targeted flow of hot gas applied thereto individually or in groups, in order to be melted thermally. The corresponding flows of hot gas may be controlled individually, that is to say independently of one another, for at least two cleaning elements, in order to achieve an individual melting and/or reshaping of the ends of the cleaning elements. Thereby, varying flows of hot gas can be generated with respect to temperature, gas volume, and/or flow geometry, so as to be applied differently to the different cleaning elements as a result. This makes it possible to measure out to each cleaning element precisely the amount of heat input that is required in order to produce the desired reshaping.

The individually controllable flows of hot gas may be created using separate nozzles that are directed toward the ends of the cleaning elements to which the hot gas flows are to be applied. By means of the aforementioned carrier part it is possible to hold said cleaning elements in a predefined arrangement corresponding to the desired distribution thereof on the brush head. Thus, the cleaning elements can have varying flows of hot gas applied to individually or optionally in groups while they are being held by the carrier part in the manner in which they are intended to be cast in the brush head. This reduces additional handling measures, such as for example grip changes or reinsertion of the cleaning elements into different carrier parts. Despite the optionally very dense arrangement, the ends of the cleaning elements can have heat applied thereto in the desired manner independently of one another.

The nozzles in this case are designed such that they can be moved into various positions relative to one another. For example the nozzles are designed to be adjustable in a manner such that the nozzles can be positioned in a grid pattern that corresponds to the grid pattern of the arrangement of the cleaning elements. The nozzles can be designed adjustable with respect to their geometry, such as, for example, the nozzle cross-section or the opening angle, in order, for example, to be able to apply varying flows of hot gas to cleaning elements having cross-sections of varying thicknesses.

The nozzles may be controlled with respect to their position and/or geometry, such as the opening angle, according to at least one property of the respective cleaning elements. Meaning in one aspect, the nozzles can be adjusted three-dimensionally according to a property of the respective cleaning elements. For example the nozzles may be adjusted such that the nozzles can be positioned in various planes according to the height grid and/or height relief of the ends of the cleaning elements. I.e. the nozzles can be positioned in the aforementioned manner at differing heights with respect to one another, in order to set a uniform distance from the ends of the cleaning elements, even when similar or identical cleaning elements are positioned in different planes. Other properties to which the position of the nozzles may be adjusted are the softening temperature and/or a cross-sectional geometry of the cleaning elements.

The hot-gas device may have a temperature control that enables the flows of hot gas exiting from the various nozzles to be controlled at differently hot temperatures in order to be able to adjust the application of heat individually to the respective cleaning elements. The temperature of the flows of hot gas in this case can be adjusted individually for each nozzle according to different parameters, for example according to a material of the respective cleaning elements, the softening temperature and/or according to the cross-sectional surface of the respective cleaning element. For example, a thicker cleaning element and/or one having a higher softening temperature can be given a hotter flow of gas than a thinner cleaning element and/or one having a lower softening temperature.

The hot-gas device may have an air volume control that can individually control the flow of air exiting from the various nozzles, such that, for example, a stronger flow of air exits from a first nozzle than from a second nozzle. The flows of air can be controlled automatically or semi-automatically according to at least one parameter, for example the softening temperature and/or the cross-sectional surface of a respective cleaning element. Alternatively or in addition, individual set nozzle geometry can be considered, for example in such a way that a greater air flow is set when the nozzle is set to a larger expansion angle. Various other parameters may also be considered.

In addition or alternatively, the ends to be thickened may have a targeted flow of infrared radiation applied thereto, in order to be melted thermally. The corresponding amount of infrared radiation may be controlled individually or in groups, e.g. independently of one another, for at least two cleaning elements, in order to achieve an individual melting and/or reshaping of the ends of the cleaning elements. Thereby, varying amounts of infrared radiation can be generated with respect to radiation time, radiation intensity and/or radiation frequency so as to be applied differently to the different cleaning elements as a result. This makes it possible to measure out to each cleaning element precisely the amount of heat input that is required in order to produce the desired reshaping.

The individually controllable amounts of infrared radiation may be created using separate reflectors that are directed toward the ends of the cleaning elements to which the infrared radiation is to be applied. By means of the aforementioned carrier part it is possible to hold said cleaning elements in a predefined arrangement corresponding to the desired distribution thereof on the brush head. Thus, the cleaning elements can have varying amounts of infrared radiation applied to individually or optionally in groups while they are being held by the carrier part in the manner in which they are intended to be cast in the brush head. This reduces additional handling measures, such as for example grip changes or reinsertion of the cleaning elements into different carrier parts. Despite the optionally very dense arrangement, the ends of the cleaning elements can have heat applied thereto in the desired manner independently of one another.

The reflectors may be designed such that they can be moved into various positions relative to one another. For example the reflectors may be designed to be adjustable in a manner such that the reflectors can be positioned in a grid pattern that corresponds to the grid pattern of the arrangement of the cleaning elements. Alternatively or in addition, the reflectors can be designed adjustable with respect to their geometry. For example, parabolic and/or elliptic reflectors can be used having various aperture and/or diameters, in order, for example, to be able to apply varying amounts of infrared radiation to cleaning elements having cross-sections of varying thicknesses.

The reflectors may be controlled with respect to their position and/or geometry according to at least one property of the respective cleaning elements. Meaning in one aspect, the reflectors can be adjusted three-dimensionally according to a property of the respective cleaning elements. For example the reflectors may be adjusted such that the reflectors can be positioned in various planes according to the height grid and/or height relief of the ends of the cleaning elements. I.e. the reflectors can be positioned in the aforementioned manner at differing heights with respect to one another, in order to set a uniform distance from the ends of the cleaning elements, even when similar or identical cleaning elements are positioned in different planes. Other properties to which the position and/or geometry of the reflectors may be adjusted are the softening temperature and/or a cross-sectional geometry of the cleaning elements.

Alternatively or in addition, the infrared-radiation device may have a frequency and/or intensity control that enables the nature and/or amounts of infrared radiation exiting from the various reflectors to be controlled in order to be able to adjust the application of heat individually to the respective cleaning elements. The frequency and/or intensity of the infrared radiation in this case can be adjusted individually for each reflector according to different parameters, for example according to a material of the respective cleaning elements and/or according to the cross-sectional surface of the respective cleaning element. For example, a thicker cleaning element and/or one having a higher softening temperature can be given more infrared radiation being more energetic than a thinner cleaning element and/or one having a lower softening temperature.

The reshaping of the ends of the cleaning elements can be carried out solely by means of the application of a targeted energy flow, for example hot gas or infrared radiation, wherein, the effects of gravity can be utilized. Thereby, the cleaning elements with their ends to be melted are positioned pointing upward, such that a melted end section is pressed downward, thus resulting in a mushroom-shaped or drop-shaped thickening.

Alternatively or in addition, a punching tool can be used to create the thickening. Said punching tool may be driven against the melted ends of the cleaning elements in order to reshape the heated ends accordingly. The punching tool can have various punching surfaces, the shapes of which are adapted in each case to one cleaning element or group of cleaning elements, and which only reshape individually the one cleaning element or one group of cleaning elements, respectively. This makes it possible for a plurality of cleaning elements to be individually reshaped by means of one punching tool having various punching surfaces. Various punching surfaces of the punching tool may be adjustable with respect to one another, in particular to be capable of being positioned in various planes with respect to one another. This makes it possible to create a punching tool pad of different punching surfaces which are positioned raised in relief-like manner at various heights, in order to enable reshaping of the ends of the cleaning elements, which ends are positioned at different heights.

In addition or alternatively a device is provided for carrying out the method as described above. Said device comprises at least a positioning unit for positioning successively or simultaneously at least two different types of cleaning elements or at least two distinctive cleaning elements of the same type or a combination thereof in at least two different mold cavities, an injection unit capable of injecting at least two different materials in the at least two different mold cavities and a heating unit for heating one end of the at least two different types of cleaning elements or at least two distinctive cleaning elements of the same type or a combination thereof. The end to be heated is the end to be over-molded. The heating unit may comprise a hot-gas device for applying hot gas or an infrared radiation device for applying infrared radiation to one end of the at least two different types of cleaning elements or at least two distinctive cleaning elements of the same type or a combination thereof. In addition or alternatively a brush head, for example a toothbrush head is disclosed having bristle tufts comprising at least two different types of cleaning elements or at least two distinctive cleaning elements of the same type or a combination thereof being cast as described above.

These and other features, which can form the subject matter of the invention irrespective of how they are summarized in the claims, optionally in sub-combination, individually or in combination with one another, will become apparent not only from the claims but also from the following description and the drawings, with the aid of which example embodiments are explained below.

Figure 1:
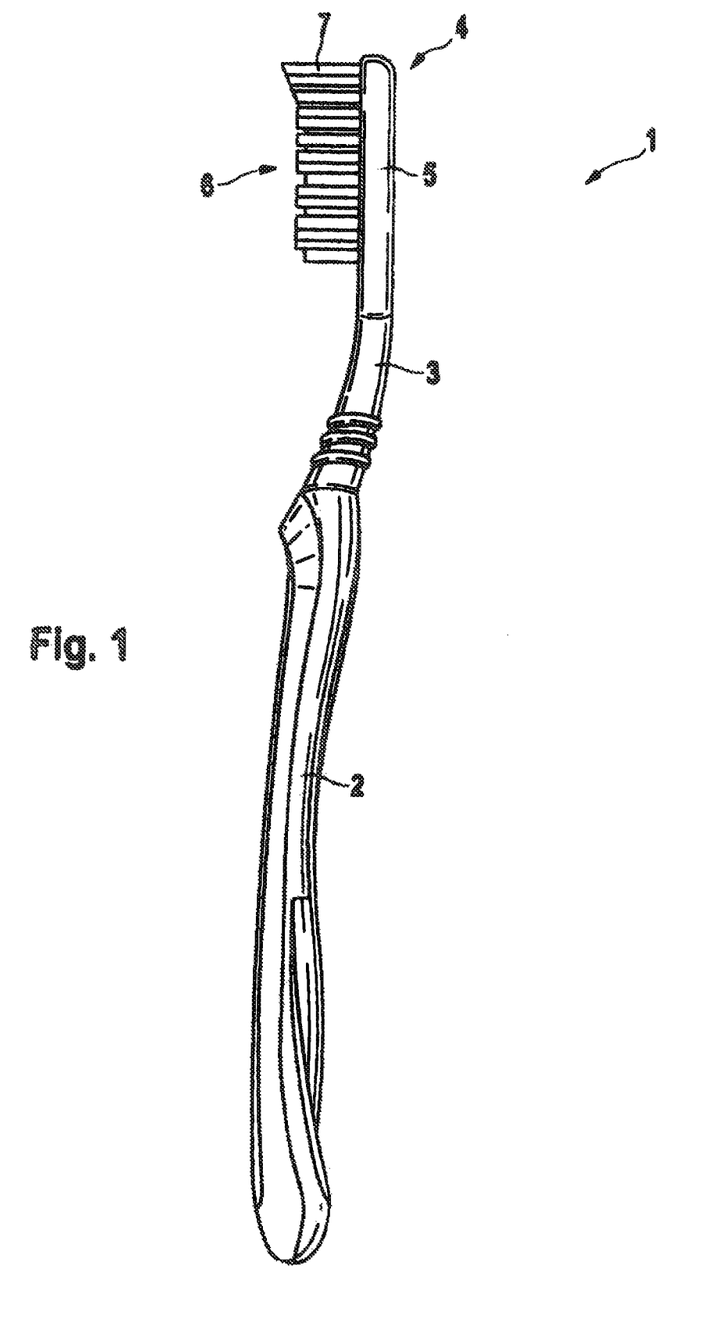
FIG. 1 shows a schematic side view of a toothbrush with a bristle field comprising a multiplicity of bristle tufts which are anchored in an injection-molded bristle carrier in a hot-tufting process.
Figure 2A:
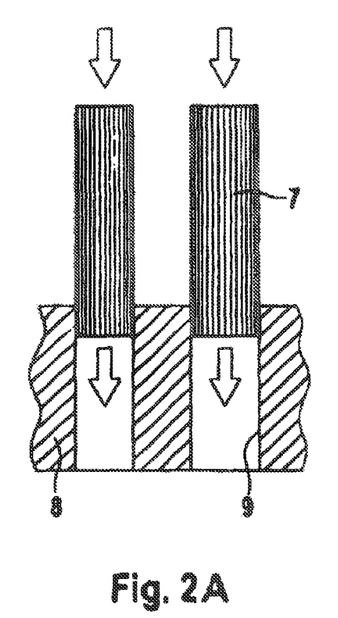
FIGS. 2A, 2B show a schematic sectional view of a carrier part for retaining the bristle tufts during the production process; insertion of the bristle tufts into the carrier part is shown in FIG. 2A, and the bristle tufts already in place are shown in FIG. 2B.
Figure 2B:
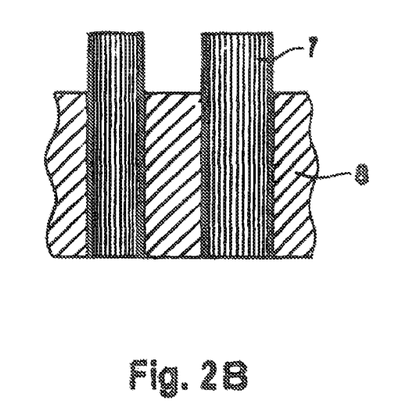

The toothbrush 1 shown in FIG. 1 comprises a shaft-like handle 2, which is connected to a brush head 4 via a neck piece 3. The brush head 4 in this case comprises a bristle carrier 5 joined to the aforementioned neck piece 3 which supports a bristle field 6, which comprises a multiplicity of bristle tufts 7. Instead of the bristle tufts 7, or in combination with the bristle tufts 7, other cleaning elements could be provided, for example in the form of elastomer strips, sponge elements, or other tooth cleaning elements. In the embodiment shown, the toothbrush 1 is designed as a manual toothbrush; however, a motor-driven toothbrush could also have a correspondingly designed brush head.

The bristle tufts 7 can usually comprise a multiplicity of bristles or filaments that are combined to form a tuft 7. The bristles or filaments in this case are cut to the desired lengths, the free ends of the tufts optionally being tapered or rounded off as desired, which can occur on the finished toothbrush 1 or can also be effected before the bristle tufts 7 are anchored on the brush head 4.

FIGS. 2-12 show the fusing of the bristle tufts 7 before they are fastened in the bristle carrier 5. According to FIG. 2A, preconfigured, for example cut-to-length, bristle tufts 7 are first placed into a carrier part 8 which may form a part of the injection mold for injection molding the bristle carrier 5 or the brush head 4 later on. As shown in FIG. 2A, the carrier part 8 comprises a multiplicity of receptacle recesses 9, which are designed in the form of a through-hole or a blind-hole and which accommodate the corresponding bristle tufts 7 with an accurately fitting. The receptacle recesses 9 may be arranged in a grid pattern that corresponds to the desired positioning of the bristle tufts 7 on the brush head 4. As shown in FIG. 2B, the bristle tufts 7 with their ends to be anchored protrude by a certain length beyond the carrier part 8, such that the aforementioned ends of the bristle tufts 7 can be positioned in a mold cavity of an injection mold, in order to be over-molded with plastic therein.

Figure 3:
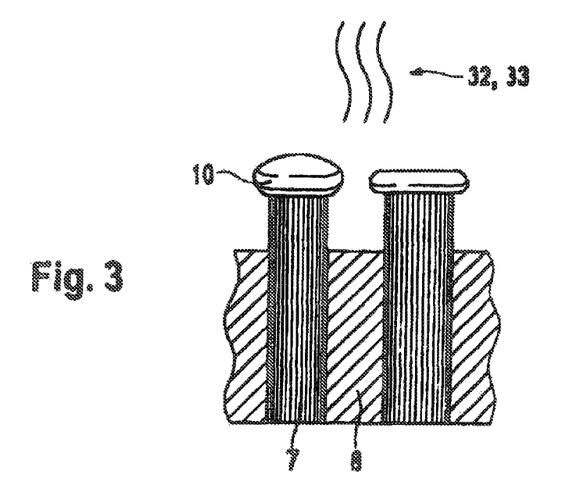
FIG. 3 shows a schematic sectional view illustrating the melting and thickening of the ends of the bristle tufts prior to the injection process.

In order to achieve increased resistance of the bristle tufts 7 against being pulled from the bristle carrier 5, the ends of the bristle-tuft 7 to be embedded are first reshaped through application of heat energy—for example using hot gas 32 or infrared radiation 33—in order to form thickenings 10, as shown in FIG. 3.

Figure 4A:
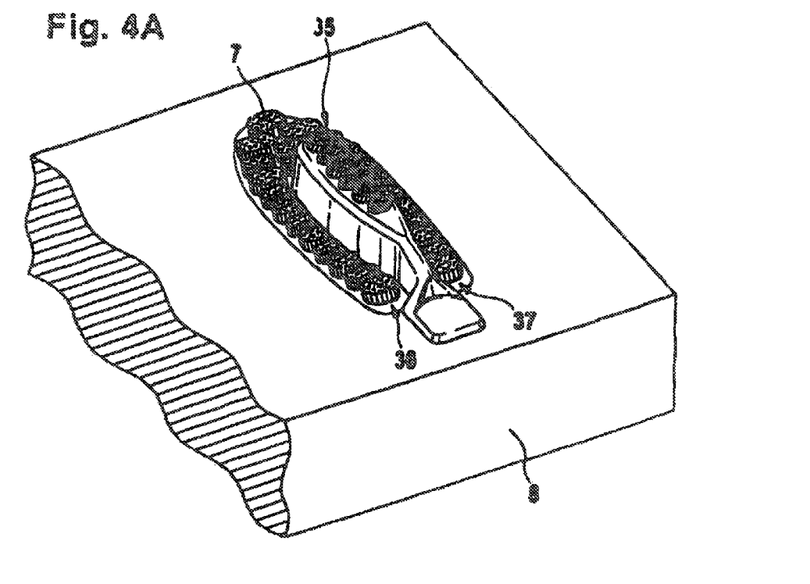
FIG. 4A shows a schematic, perspective illustration of the bristle tufts situated in the carrier part, which shows the positioning of the bristle tufts according to the subsequent arrangement thereof on the brush head.
Figure 4B:
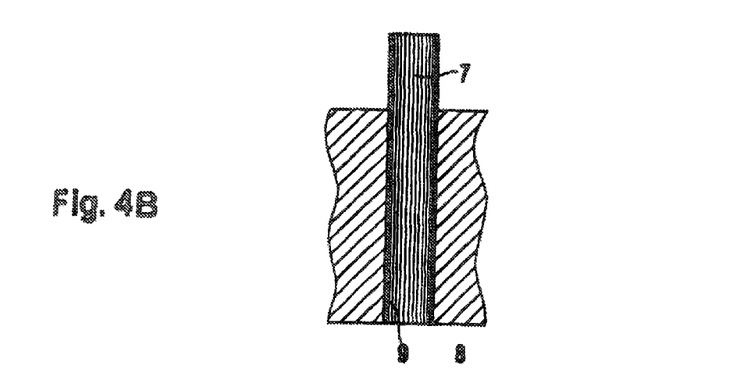
FIG. 4B shows, in a partial detail view, an enlarged sectional view of a bristle tuft in the carrier part according to FIG. 4A.

In order to produce the thickenings 10, the ends of the bristle tufts 7 protruding from the carrier part 8 are first melted through application of hot gas 32 or infrared radiation 33. FIGS. 4A and 4B show the initial state, in which the bristle tufts 7 are positioned in the carrier part 8, in the arrangement according to the bristle field 6 to be created, a still non-reshaped bristle tuft 7 being shown according to FIG. 4B. According to FIG. 4A, the ends to be melted of the bristle-tufts 7 are arranged in different planes so that the tuft ends define a three-dimensional arrangement, cf. FIG. 4a. In the embodiment shown, the ends of bristle tufts 7 of a center row 35 are positioned higher than the bristle tufts of rows 36, 37 lying on the outside.

In order to still be able to achieve an individually adapted melting despite the three-dimensional distribution and optional varying cross-sectional surface of the individual bristle tufts 7, the required amount of heat is supplied individually to each bristle tuft 7 via variable hot gas input 32 or infrared radiation 33 using a hot-gas device 11 or an infrared-radiation device 34. Alternatively or in addition identical amounts of hot gas or infrared radiation can be applied to one or more adjacent bristle tufts 7. Alternatively or in addition, identical amounts of hot gas 32 or infrared radiation 33 may be applied to rows and/or special arrangements of bristle tufts 7.

Figure 5A:
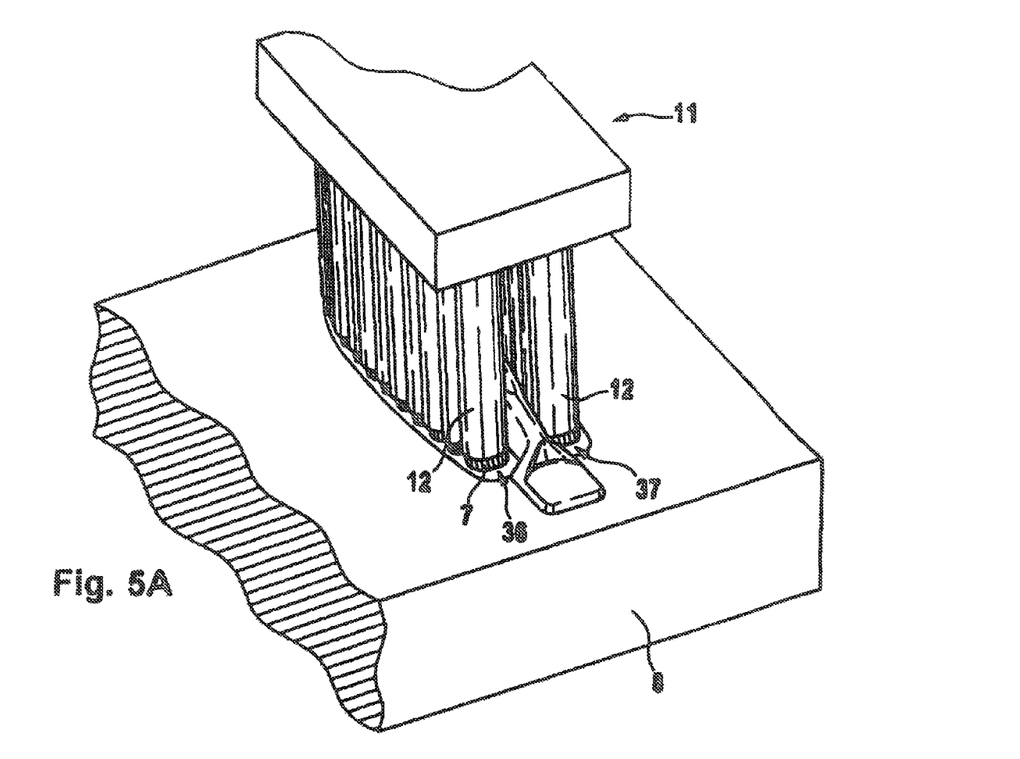
FIG. 5A shows a schematic, perspective illustration of the melting, through application of hot gas to the ends of the bristle tufts to be embedded, wherein the hot-gas tool is shown in a working position.
Figure 5B:
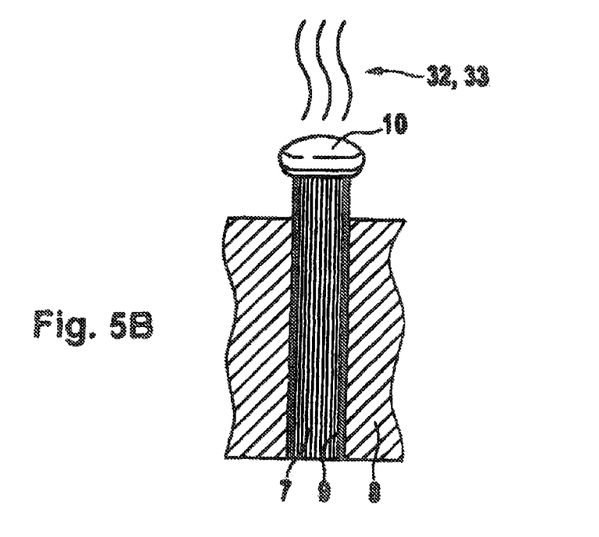
FIG. 5B shows, in a partial detail view, an enlarged sectional view of the bristle tuft in the carrier part according to FIG. 5A.
Figure 6:
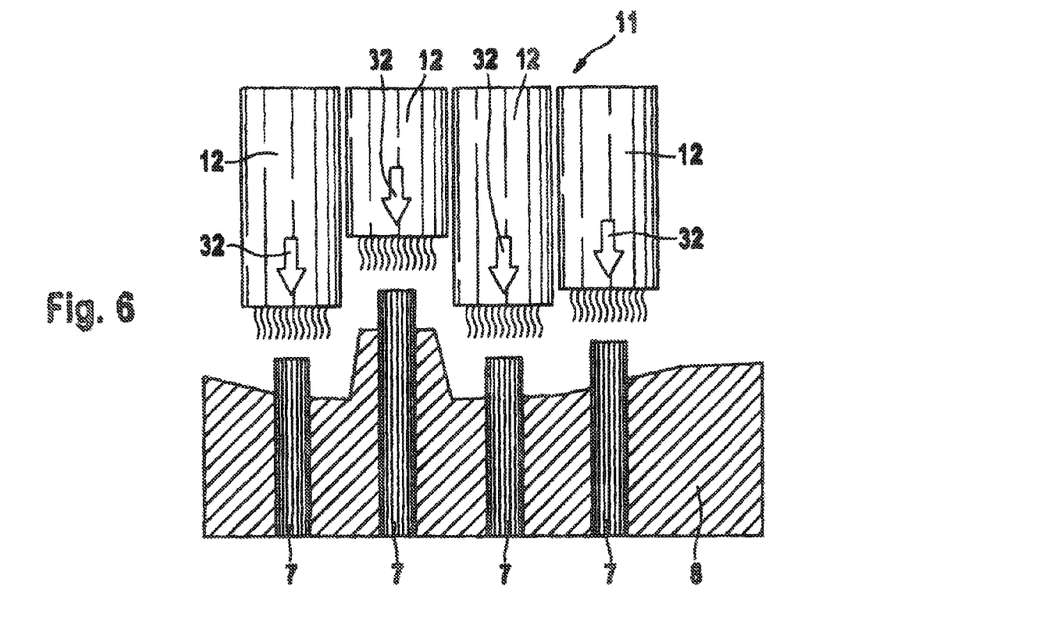
FIG. 6 shows a schematic sectional view of the hot-gas device and the nozzles thereof at the bristle-tuft ends protruding out of the carrier part prior to the melting process.

As shown in FIGS. 5A, 5B, and 6, the hot-gas device 11 comprises a multiplicity of nozzles 12, which are positioned with respect to one another in a grid-like arrangement which substantially corresponds to the distribution of the ends of the bristle tufts in the carrier part 8. In the embodiment shown, tubular gas outlet channels are provided as the nozzles 12, cf. FIG. 5a.

The nozzles 12 may be supported to be three-dimensionally adjustable; for example, they can be positioned at various heights in the longitudinal direction of the nozzles 12, as shown in FIG. 6 meaning that different nozzles 12 may be positioned in different planes with respect to the ends to be heated. The outlet openings of the nozzles 12 can be placed in a raised, relief-like pattern that corresponds, in a complementary manner, to the raised, relief-like arrangement of the tuft ends in the carrier part 8, such that the distance between the nozzles 12 and the respective ends of the tufts can be adjusted individually. The distance between the nozzles 12 and the respective ends of the tufts can be adjusted individually in all direction in space.

In the embodiment shown in FIG. 6, consistent distances can be set between the nozzles 12 and the ends of the tufts 7 to heat the tufts 7 equally. However, different distances can also be used taking into consideration various parameters, for example different bristle materials, tuft cross-sections and geometries. Alternatively or in addition, different designs of the thickenings 10 may be desired, which may also entail a different setting of the nozzles 12 to heat the end of the tufts 7 differently.

The cross-section of the nozzles 12 may be adapted to the cross-section of the respective bristle tufts 7, for example such that thicker nozzles 12 are assigned to thicker bristle tufts 7. In order to achieve greater variability in this case, nozzles 12 may be optionally used that are adjustable in the cross-section thereof. If inclined bristle tufts 7 are used, it may be advantageous to be able to change the adjustment angle of the nozzles 12.

Alternatively or in addition to the adjustability of the nozzles 12, the hot-gas device 11 may also vary the temperature and the amount or the mass flow of the hot gas flow. To this end, a temperature-control device and/or regulating device and a mass flow control and/or regulating device may be provided which can be designed in such a way that the temperature of the hot gas flows 32 and/or the air volumes and/or the mass flow exiting from each nozzle 12 can be individually adjusted for each nozzle 12, i.e. independently of each of the other nozzles 12. In this way, the desired amount of heat can be supplied individually to each bristle tuft 7, such that the melting of the ends of the bristles can be controlled in a targeted manner.

Figure 7:
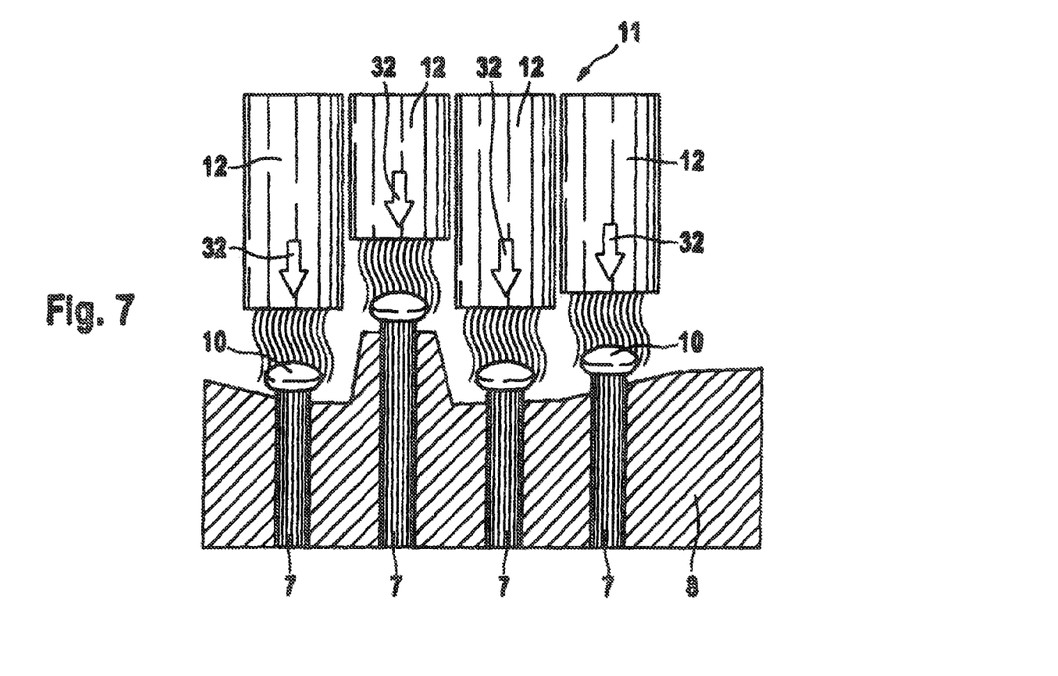
FIG. 7 shows a schematic sectional view of the hot-gas device, similar to FIG. 6, the bristle tufts being shown after the melting and formation of an end-side thickening.
Figure 8A:
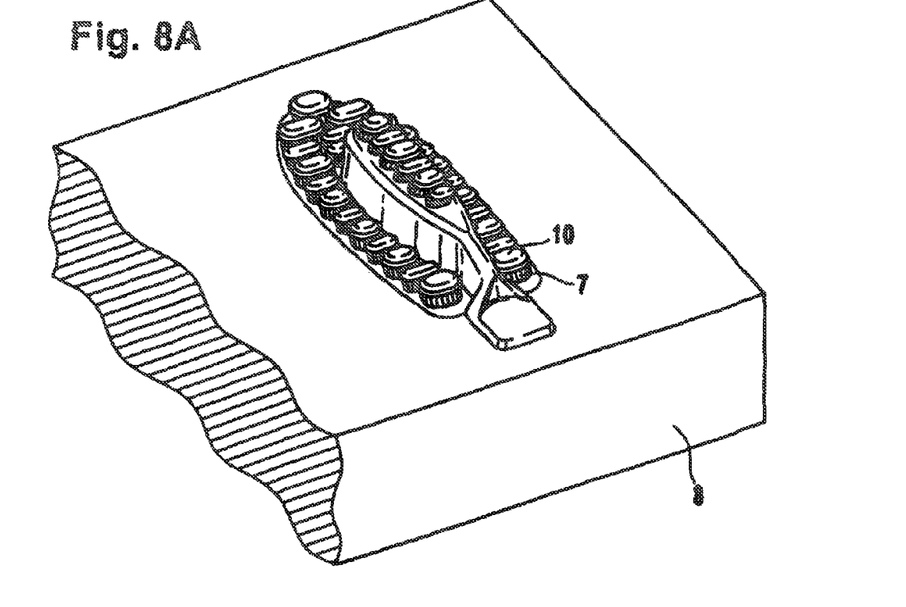
FIG. 8A shows a schematic, perspective illustration of the bristle tufts situated in the carrier part with a melted end section after heat treatment by means of hot gas.
Figure 8B:
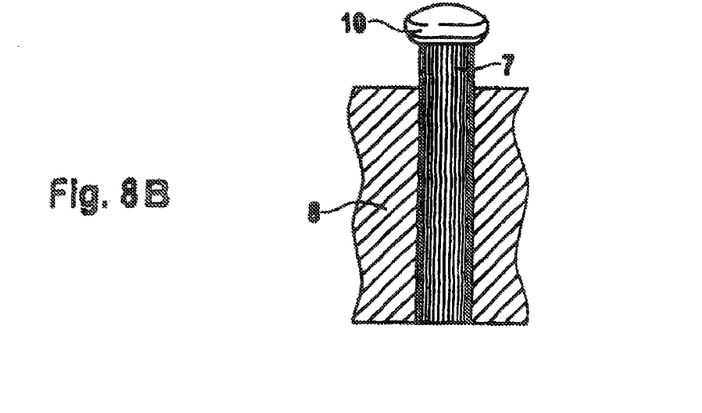
FIG. 8B shows a partial view of an enlarged sectional view of a bristle tuft with a melted end section according to FIG. 8A.

As a comparison of FIGS. 6 and 7 shows, the ends of the bristle tufts 7 are melted by the application of hot gas 32 coming from the nozzles 12 to the extent that drop-shaped thickenings 10 form due to the effects of gravity and surface tension. The bristle tufts 7 are arranged in an essentially vertical orientation with the ends to be melted pointing upwards when the hot gas is applied, cf. FIGS. 6 and 7. Bristle tufts can be angled as discussed above.

Generally, it would be possible to successively approach each bristle tuft 7 to be melted, using a corresponding nozzle 12. However, all of the bristle tufts 7 can be melted simultaneously using a multiplicity of nozzles 12, thereby achieving short process times. Anyway, it is also conceivable for only a part of the bristle tuft 7 to be melted. According to FIGS. 8A and 8B, it is, possible to soften all of the bristle tufts 7 in the bristle field by melting, in order to achieve a corresponding increase in the pull-out resistance of all of the bristle tufts in a plastic material.

Figure 9A:
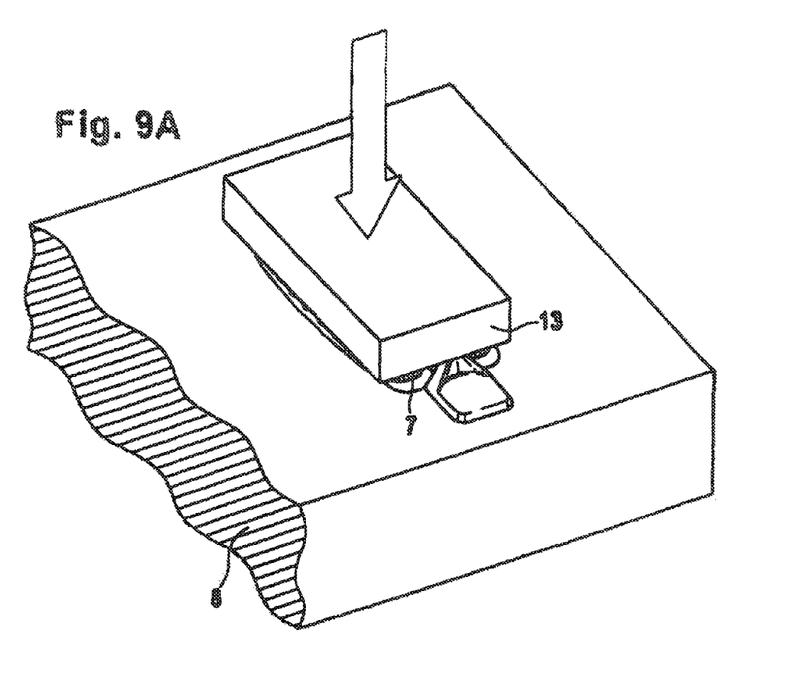
FIG. 9A shows a schematic, perspective illustration of the mechanical reshaping by means of a punching tool of the melted end sections of the bristle tufts situated in the carrier part.
Figure 9B:
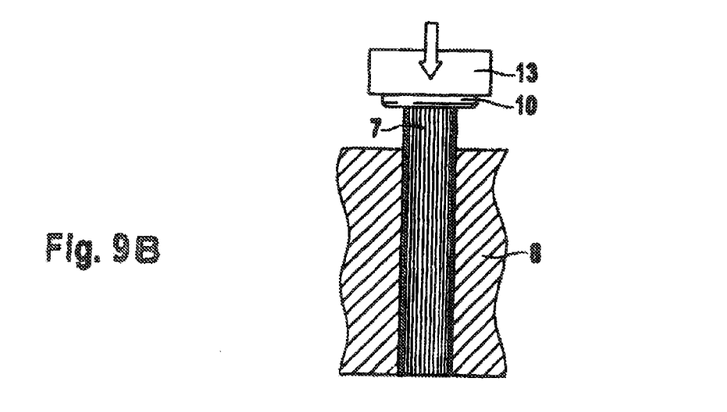
FIG. 9B shows a partial view, in an enlarged illustration, of a bristle tuft and the reshaping of the melted end section thereof by means of a section of the punching tool.
Figure 10:
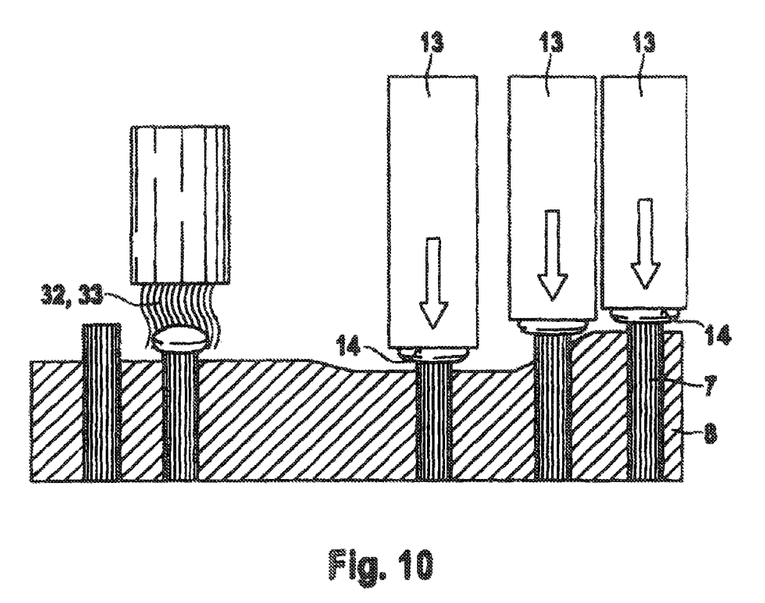
FIG. 10 shows a schematic sectional view through a punching tool for mechanical reshaping of the melted end sections of the bristle tufts, wherein the punching tool has different three-dimensional punching sections which can be positioned.
Figure 11A:
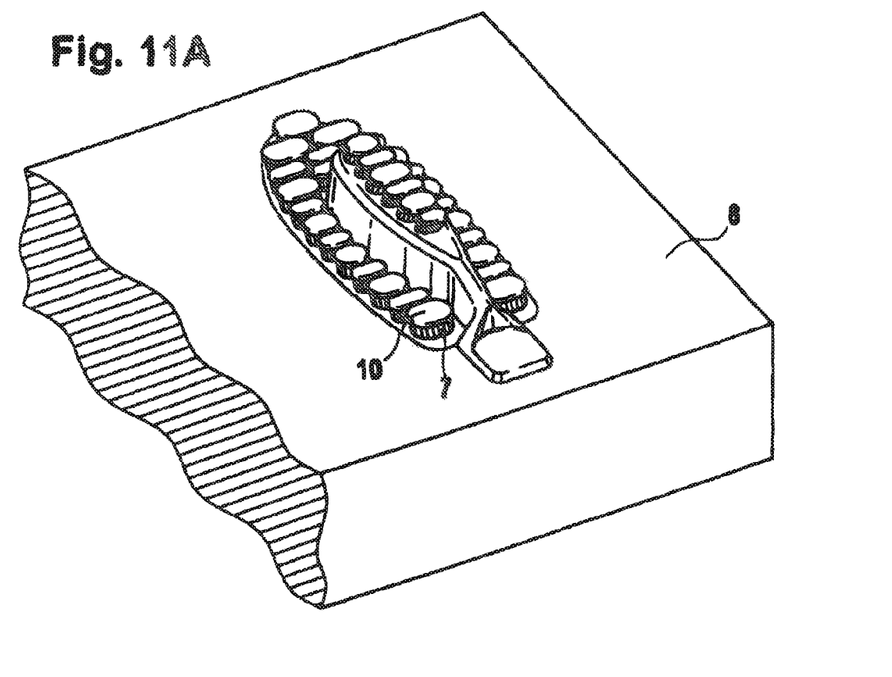
FIG. 11A shows a schematic, perspective illustration of the finished reshaped end sections of the bristle tufts situated in the carrier part.
Figure 11B:
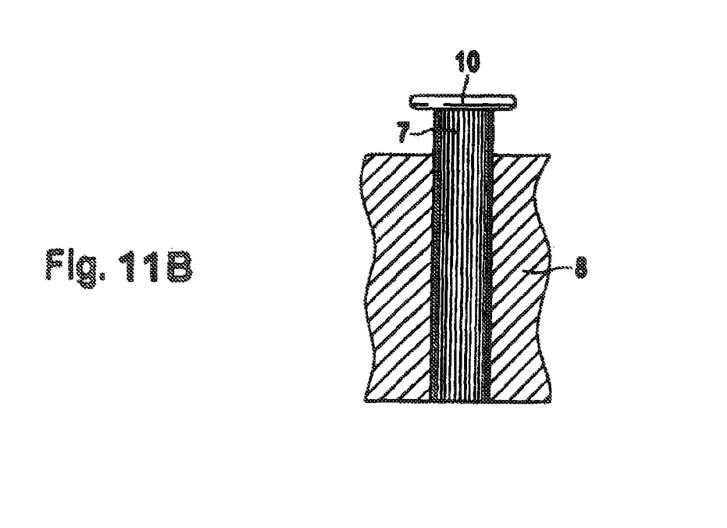
FIG. 11B shows a partial view, in an enlarged sectional view, of an individual finished reshaped bristle tuft.

As shown in FIGS. 9-11, a mechanical reshaping of the melted thickenings 10 can be performed. To this end, a punching tool 13 is used which is moved up against the still-soft, malleable thickenings 10, in order to shape said thickenings 10 in the desired manner. As shown in the figures, a flat, disk-shaped thickening 10 is generated in such a way that a flat punching tool 13 is pressed on the front side against the ends of the tufts. Differently contoured punching surfaces can also be used to generate differently contoured thickenings.

The punching tool 13 may not have a continuous flat punching surface, but rather a multiplicity of punching surfaces 14, which may be placed in different planes and/or differently contoured, in order to generate the desired thickening 10 individually for each bristle tuft 7 or for one or more adjacent bristle tufts 7. For example, the punching surfaces 14 may be applied to rows and/or special arrangements of bristle tufts 7 in order to generate an identical thickening 10 for several bristle tufts 7. In particular, the punching surfaces 14 can form a complementary height profile according to the raised, relief-like height profile of the bristle tufts 7 positioned in the carrier part 8, in such a way that the punching surfaces 14 are arranged in various planes in the height profile, as shown in FIG. 10.

Owing to a parallel reshaping process of all melted ends of the bristle tufts 7, same can be shaped in the desired way in a time-parallel manner, as shown in FIGS. 11A and 11B. In particular, thin, flat, and/or plate-shaped thickenings 10 can be created, even when the ends of the bristle tufts 7 are positioned in different planes and/or provided with different geometries and/or consist of various materials.

After forming the thickenings 10 by means of hot gas flows 32, the ends of the bristle tufts 7 can be anchored by over-molding in a bristle carrier 5; i.e., they are cast into the bristle carrier 5 during production thereof.

Figure 12:
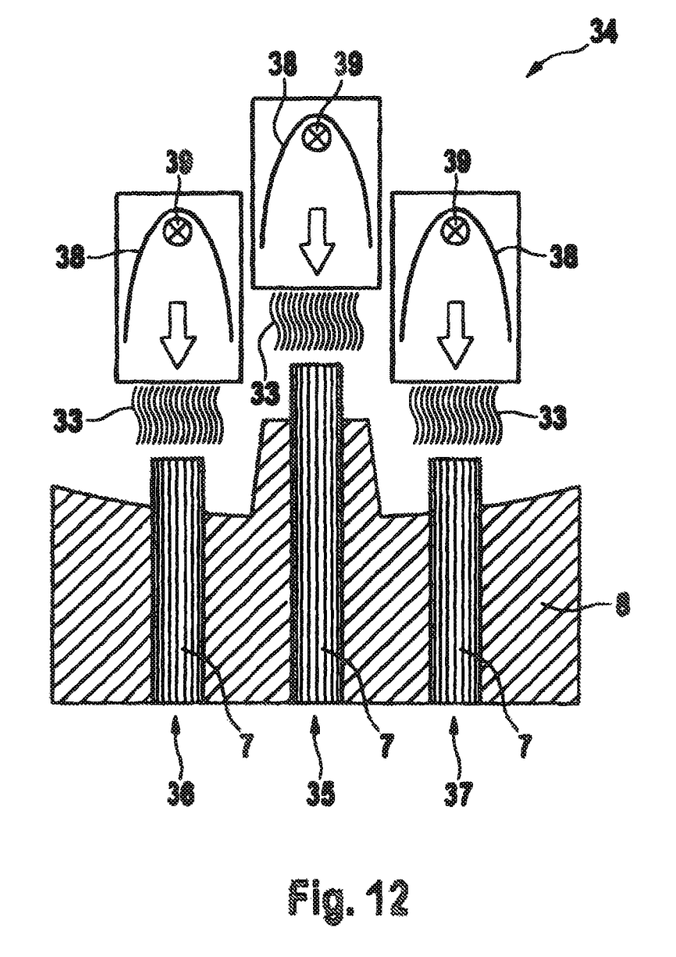
FIG. 12 shows a schematic sectional view, similar to that in FIG. 6, but with an infrared-radiation device, instead of a hot-gas device, and the reflectors of the infrared-radiation device at the bristle-tuft ends protruding from the carrier part prior to the melting process.

FIG. 12, in another embodiment, shows instead of a hot gas device 11 analogous to FIGS. 5A, 5B to 11A, 11B, an infrared radiation device 34 having reflectors 38 being positioned at the ends of the bristle tufts 7 protruding from the carrier part 8, to melt the ends of the bristle tufts 7 to form thickenings 10. A multiplicity of reflectors 38 having an infrared radiation 33 from an infrared radiation source 39 are directed onto the protruding ends of the bristle tufts 7 in order to apply various degrees of infrared radiation to the various cleaning elements.

The reflectors 38 in the infrared radiation device 34 are designed to be adjustable with respect to one another, for example spatially adjustable. For example, the reflectors 38 may be designed to be positionable at various heights and/or in various planes and/or may be designed to be adjustable with respect to the distances thereof from one another and/or may be supported three-dimensionally adjustable with respect to one another. A temperature-control device and/or regulation device may be provided, independently of one another, for controlling and/or regulating the infrared radiation 33 exiting from the reflectors 38. The regulation device can be provided also as a control device or a combined control and regulation device, for controlling and/or regulating the infrared radiation 33 exiting from the reflectors 38. Suitable regulation parameters may be the radiation time, radiation intensity and/or radiation frequency.

After formation of the thickenings 10 using hot gas flows 32 or infrared radiation 33, the ends of the bristle tufts 7 are mounted by over-molding into the bristle carrier 5 or directly in the brush head 4; i.e., they are cast into the bristle carrier 5 during production thereof. The embedment can be done with positive engagement. The injection-molding of the bristle carrier 5 to the bristle tufts 7 can generally take place in various ways.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for producing a brush head in which at least two different cleaning elements selected from the group consisting of different types of cleaning elements, distinctive cleaning elements of the same type and a combination thereof, are embedded at one of their ends at least partially in a bristle carrier, wherein the ends are fused by infrared radiation before embedding, wherein different amounts of infrared radiation are supplied to each of the at least two different cleaning elements, wherein the different amounts of infrared radiation are supplied by a plurality of reflectors that are spatially adjustable relative to one another, and wherein the different amounts of infrared radiation are controlled by a frequency or intensity of the infrared radiation.

2. The method according claim 1, wherein the ends of the cleaning elements to be embedded are fused by being subjected, either individually or in groups, to the radiation.

3. The method according to claim 2, wherein the radiation that is directed towards the end of the cleaning elements is created using separate reflectors.

4. The method according to claim 1, wherein the at least two different cleaning elements are held by a carrier part in a predefined arrangement according to their desired distribution on the brush head.

5. The method according to claim 1, wherein the different amounts of heat that are supplied to each of the at least two different cleaning elements depend on at least one property in which the at least two different cleaning elements are distinguishable from each other.

6. The method according to claim 5, wherein the at least one property in which the at least two different cleaning elements are distinguishable is at least one of the material, the colour, the thickness, the outer shape, the composition and the distance to the source of the heat.

7. The method according to claim 1, wherein after the ends of the at least two different cleaning elements have been heated, a punching tool is moved against the softened ends for reshaping them.

8. The method according to claim 7, wherein, the punching tool has a flat or a structured surface.

* * * * *